United States Patent

[11] 3,617,574

[72] Inventor Ludwig Maier
  Tiergartenstrasse 17, Kilchberg, Zurich, Switzerland
[21] Appl. No. 7,429
[22] Filed Jan. 12, 1970
[23] Division of Ser. No. 690,418 Dec. 14, 1967
[45] Patented Nov. 2, 1971

[54] PROCESS OF INHIBITING PRECIPITATION BY THE USE OF PHOSPHORUS COMPOUNDS CONTAINING THE ATOM SKELETON P-(C-P) OR P-(C-P)
13 Claims, No Drawings
[52] U.S. Cl. ................................................. 210/58, 252/180, 260/502.4
[51] Int. Cl. .................................................. C02b 5/06
[50] Field of Search ................................... 260/932, 969, 502.4; 210/58; 252/180

[56] References Cited
UNITED STATES PATENTS

| | | | |
|---|---|---|---|
| 3,332,986 | 7/1967 | Block et al. | 260/500 |
| 3,422,137 | 1/1969 | Quimby | 260/502.4 |
| 3,451,939 | 6/1969 | Ralston | 210/58 X |

Primary Examiner—Michael Rogers
Attorneys—John D. Upham, Joseph D. Kennedy and L. Bruce Stevens, Jr.

ABSTRACT: Phosphorus compounds containing the skeleton P-(C-P)$_2$ or P-(C-P)$_3$ of the formula P(O)$_a$(R$^1$)$_b$[CH P(O)(R$^2$)R$^3$]$_{3',b}$ and method for making by reacting a compound of the formula P(O)$_a$(R$^1$)$_b$(CH$_2$Cl)$_{3',b}$ with a compound of the formula P(R$^5$)(R$^6$)OR$^4$ to split off R$^4$Cl. Also uses of the products as threshold agents, sequestering agents, detergent composition additives, peroxy solution stabilizers and chlorine releasing agent stabilization is claimed.

PROCESS OF INHIBITING PRECIPITATION BY THE USE OF PHOSPHORUS COMPOUNDS CONTAINING THE ATOM SKELETON P-(C-P) OR P-(C-P)

This application is a division of application, Ser. No. 690,418, filed Dec. 14, 1967.

This present invention relates to phosphorus compounds containing the atom skeleton P–C–P)$_2$ or P–(C–P)$_3$ and corresponding to the general formula $$P(O)_a(R^1)_b[CH_2P(O)(R^2)R^3]_{3\text{-}b}$$ 

in which $R^1$, $R^2$, and $R^3$ signify possibly substituted and/or ethylenically or acetylenically unsaturated hydrocarbon groups or heterocyclic groups attached through a carbon atom, RO groups where R is the group of a hydroxyl compound, HO groups, MO groups where M is a metal atom, ammonium or substituted ammonium, and preferably at least one RO, HO, or MO group is present, $a$ signifies 0 or 1, and $b$ 0 or 1, to a process for preparing these compounds and to compositions containing these compounds. Normally, each R group, i.e., $R^1$, $R^2$, $R^3$, etc., will have not more than 24 and for some use not more than eight carbon atoms.

The process is characterized in that a bis-chloro-methyl-phosphorus compound or a tris-chloromethyl-phosphorus compound of the general formula $$P(O)_a(R^1)b(CH_2Cl)_{3\text{-}b}$$

in which $R^1$, $a$ and $b$ have the same significance as above, and a phosphorous acid triester, phosphonous acid diester or phosphinous acid ester of the general formula $$P(R^5)(R^6)OR^4$$

in which $R^5$ and $R^6$ have the same significance as $R^2$ and $R^3$ above except not being HO or MO groups and $R^4$ signifies an aliphatic, cycloaliphatic or araliphatic hydrocarbon group, whose chlorine derivative $R^4Cl$ is volatile at the reaction temperature and the pressure employed are brought to reaction at a temperature between about 140° and 200° C., the hydrocarbyl chloride formed as a byproduct is continuously removed, possibly under reduced pressure from the reaction mixture, the ester groups present in the formed product can be converted to the corresponding acid groups in known manner and the acid groups can be converted to the metal salts, ammonium salts or substituted ammonium salts in known manner.

Assays for preparing compounds showing the atom skeleton P–(C–P) by reaction of $(RO)(O)P(CH_2Cl)_2$ with NaP(O)(OC)$_2$H$_{52}$ have been unsuccessful [U.S. Air Force Technical Report, Contract AF 33 (616)–6950 (1960)]. Other indications dealing with the preparation of corresponding phosphorus compounds showing the atom skeleton P–(C–P) OR P–(C–P)$_3$ are not found in the prior art.

As compared with the already known methylene-bis-phosphonic acids and their esters and salts, the compounds of invention possess the atom skeleton P–(C–P)$_2$ or P–(C–P)$_3$ and may contain up to six ester groups or hydroxyl groups attached to the phosphorus atoms. By this, they are superior in respect of their qualities and possibilities of application. If they bear similar groups the novel esters, for example, show generally higher boiling points and consequently to the extent that they are liquids, also a wider liquid range. The complexing power, the emulsifying or dispersing ability and the thermal resistance are better as compared with the well-known compounds. Therefore, they are better suited for utilizations such as complexing agents, surfactants, plasticizers, hydraulic fluids, corrosion inhibitors, stabilizers for peroxides and hydroperoxides, additives to electrolytic baths, heat transfer agents, lubricants, oil additives, gasoline additives and additives to detergents, and they provide technical advantages.

Some of the compounds of invention having ester groups are soluble in water as long as the alcohol group does not possess more than three carbon atoms. The acids formed by hydrolysis of the ester groups can be used in aqueous solution in the form of salts, e.g., sodium salts, potassium salts and amine salts. They can form soluble complexes with certain metals such as calcium, magnesium, iron, copper, lead, silver, uranium. However, such complexes are also formed by the compounds of invention containing two or more ester groups instead of hydroxyl groups. In general, the complexing power increases with the number of ester groups or hydroxyl groups.

The novel phosphine oxides, e.g. tris-(0,0'-diethyl-phosphonylmethyl)-phosphine oxide and bis-(0,0'-diethyl-phosphonylmethyl)-methylphosphine oxide, display an unusual absorption capacity in that they bind a multiple of their weight of many solvents or organic liquids so strongly that a gel is formed similar to the solutions of certain polymers (cf. Example 3). Such phosphine oxides therefore are especially suited for the fixation of certain liquid compounds, e.g. essential oils and plasticizers.

The reactions leading to the novel compounds proceed according to the equation $$P(O)_a(R^1)_b(CH_2Cl)_{3-b} + 3-b.P(R^2)(R^3)OR^4 \longrightarrow$$ 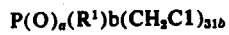
$$P(O)_a(R^1)_b[CH_2P(O)(R^2)R^3]_{3-b} + 3-bR^4Cl$$ 

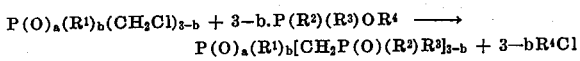

The bis-chloromethyl-phosphorus compounds and tris-chloromethyl-phosphorus compounds referred to first are phosphines, phosphine oxides and phosphinic acid esters containing two or three chloromethyl groups linked to the phosphorus atom. If only two chloromethyl groups are present, there is attached a further organic group via a carbon atom or oxygen atom to the phosphorus atom.

Suitable organic phosphines are, for example tris-chloromethyl-phosphine, bis-chloromethyl-methylphosphine, bis-chloromethyl-vinylphosphine, bis-chloromethyl-n-propylphosphine, bis-chloromethyl-iso-amylphosphine, bis-chloromethyl-3-butynylphosphine, bis-chloromethyl-dodecylphosphine, bis-chloromethyl-cyclopentylphosphine bis-chloromethyl-pentafluorocyclohexylphosphine, bis-chloromethyl-benzylphosphine, bis-chloromethyl-cinnamylphosphine, bis-chloromethyl-tolylphosphine.

Suitable phosphine oxides are, for example, tris-chloromethylphosphine oxide, bis-chloromethyl-ethylphosphine oxide, bis-chloromethyl-ethynylphosphine oxide, bis-chloromethyl-allylphosphine oxide, bis-chloromethyl-tert-butylphosphine oxide, bis-chloromethyl-3-cyclopentenylphosphine oxide, bis-chloromethyl-cyclooctylphosphine oxide, bis-chloromethyl-styrylphosphine oxide, bis-chloromethyl-dimethylaminophenylphosphine oxide.

Tris-chloromethyl-phosphine can be prepared in the following way: Tetrakis-hydroxymethyl-phosphonium chloride is converted by phosphorus pentachloride in carbon tetrachloride to the tetrakis-chloromethyl-phosphonium chloride, and the latter is decomposed by sodium bicarbonate and the intermediate to be used herein is extracted by ether [A. Hoffman, J.A.C.S. 52, 2995 (1930)].

For the preparation of tris-chloromethyl-phosphine oxide which is a further starting compound in the instant process, the tris-chloromethyl-phosphine is converted by treating with the calculated amount of bromine to the tris-chloromethyl-dibromophosphoran, the latter is decomposed by water and sodium hydroxide and the tris-chloromethyl-phosphine oxide is extracted with a solvent, e.g. benzene.

Further starting compounds can be prepared, for example, by reacting bis-chloromethyl-chlorophosphine or bis-chloromethyl-phosphinic acid chloride with a Grignard compound. Thus, the choice of the organic group $R^1$, if being a hydrocarbyl or heterocyclic group, depends on the available Grignard compounds. The numerous possible substituents therefore do not have to be enumerated specifically.

The bis-chloromethyl-phosphinic acid esters serving as further starting compounds can be prepared, for example, as follows: At first, bis-chloromethyl-phosphinic acid chloride is prepared in known manner [K. Moedritzer, J.A.C.S. 83, 4381, (1961)]. This compound can be prepared especially conveniently by heating bis-hydroxymethyl-phosphinic acid with excess thionyl chloride. The chlorine atom being attached to the phosphorus atom is subsequently exchanged for an ester group by reacting expediently in the presence of a tertiary amine with a hydroxyl compound able to be esterified. Thus, the choice of the organic group $R^1$, if an RO group, depends on the available alcohols, phenols and heterocyclic hydroxyl compounds which are capable of being esterified with phosphinic acid. The number of suitable compounds and possible substituents is very great.

Suitable phosphinic esters are, e.g. bis-chloromethyl-phosphinic acid methylester, bis-chloromethyl-phosphinic acid isopropylester, bis-chloromethyl-phosphinic acid decylester, bis-chloromethyl-phosphinic acid benzylester, bis-chloromethyl-phosphinic acid p-fluorophenylester, bis-chloromethyl-phosphinic acid 3-allylphenylester.

Phosphorous acid triesters, phosphonous acid diesters and phosphinous acid esters, as they have been formulated in the equation above, serve as further reactants. These starting compounds can be prepared according to well-known processes [Kosolapoff, Organophosphorus Compounds 1950; phosphites: p. 184–187; phosphonites and phosphinites: p. 358–359; and Houben Weyl, Tome XII/1 and 2]. The number of suitable phosphites is great.

There are known, for example, phosphites whose ester groups on the phosphorus atom are alike or different and where R in the RO group can be, for example, one of the following groups: methyl, ethyl, propyl, iso-propyl, butyl, iso-butyl, iso-amyl n-hexyl, n-heptyl, n-octyl, 2-octyl, n-hexadecyl, 2-decahydronaphthyl, menthyl, benzyl, diphenylmethyl, 4-phenylethyl-phenylethyl, 2-[1,3-bis-p(m or o)-tolyl]-propyl, phenyl, biphenylyl, 1- or 2-naphthyl, 2,2'-(1,1'-dinaphthylyl), 1-anthryl, cholesteryl, 2-, 3- or 4-tolyl, pseudocumyl, p-tert-butylphenyl, o-cyclohexylphenyl and 2-(4-methyl-5-thiazolyl)-ethyl.

These groups can also bear substituents. Known examples are 2-chloroethyl, 1-trifluoromethyl-ethyl, 1-carbethoxylethyl, tert-butylnitril, α-carbethoxybenzyl, 2- and 4-chlorophenyl, pentachlorophenyl, 2-methoxyphenyl, 4-nitrophenyl, 2-trichloromethylphenyl, 2-trichloromethyl-4,6-dichlorophenyl, 2,4,6-tris-trichloromethyl-phenyl and 1-(2,4-dibromo)-naphthyl.

These groups, moreover, can also be unsaturated. Known examples are allyl, 1-iodoallyl and 4-allyl-2-methoxyphenyl.

Moreover, two ester groups on the same phosphorus atom can be linked together. Such ester groups are derived from diols, like 1,2-dihydroxyethane, 1,3-dihydroxypropane, 1,2-dihydroxypropane, ortho-hydroxybenzyl alcohol, pyrocatechin and ortho-dihydroxypyridine If, for the sake of simplicity herein, these compounds are called 0,0'-diorgano compounds such kinds of 0,0'-cyclo compounds will be included. $R^2$ and $R^3$ accordingly also signify groups of hydroxyl compounds which are esterifiable with phosphinic acid, phosphorus acid, phosphonous acid and phosphinous acid.

The phosphonous acid diesters contain one organic group and the phosphinous acid esters two organic groups which are linked via a carbon atom to the phosphorus atom. They can be the same groups as have been enumerated for the bis-chloromethyl-phosphines and bis-chloromethyl-phosphine oxides. In the reaction of an organic phosphite, phosphonite or phosphinite, one of the ester groups must be able to undergo the Arbuzov-Michaelis reaction. Thus, one of these ester groups has only an auxiliary function and its organic constituent $R^4$ will be split off as chlorohydrocarbon. In order to avoid undesired byproducts, the chlorohydrocarbon should be removed continuously from the reaction mixture. It therefore will be volatile at the reaction temperature.

$R^4$ preferably possesses one to four carbon atoms so that the alkyl chloride formed will very fast escape from the reaction mixture at the reaction temperature. If necessary, the reaction can be carried out under reduced pressure.

The process is carried out preferably at about 140° to 180° C. The application of higher temperatures is less desirable in view of possible side reactions which may lead to undistillable polymeric compounds. In general, about 200° C. should not be exceeded. The reaction can be observed and controlled by determining the alkyl chloride evolving from the reaction mixture. It is advantageous to use excess phosphorous acid, phosphonous acid or phosphinous acid which acts as a solvent and can be recovered by distillation. The reaction may also be performed in an inert solvent. High boiling hydrocarbons such as xylene, decalin, methylnaphthalene and ethylnaphthalene are suitable for this purpose. The reaction is expediently carried out in an inert atmosphere, e.g., nitrogen, if easily oxidizable trivalent phosphorus compounds are reacted.

The manufacture of the corresponding acids can be achieved by acid hydrolysis, e.g., by hydrochloric acid. A particular advantageous method for preparing the acids is based on the thermal decomposition of the corresponding isopropyl esters. Propylene is split off quantitatively at about 190° C. leaving the acid in 100 percent yield.

The acids can be added in the form of alkali salts or salts of organic bases to the usual liquid or solid detergents and rinsing agents and they can replace totally or partly the complexing agents such as sodium tripolyphosphate, sodium hexametaphosphate, trisodium nitrilo triacetate, tetrasodium ethylenediamine tetracetate, tetrasodium methylene diphosphonate, tetrasodium hydroxyethylidene diphosphonate, etc. used until now. The hexasodium salt of tris-(dihydroxyphosphonylmethyl)-phosphine oxide, for example, is capable of binding calcium about three times as much as sodium tripolyphosphate under the same conditions. Moreover, the thermal resistance and partly also the hydrolytic resistance are substantially greater in comparison to complexing agents employed up to now. The surface active compounds contain expediently a straight-chain alkyl group showing about 10 to 18 carbon atoms.

The uses of the new compounds of the invention are further illustrated in detail as follows:

THRESHOLD AGENTS

Most commercial water supplies contain alkaline earth metal cations, such as calcium, barium, magnesium, etc. and several anions, such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction product, a solid phase of calcium carbonate will form.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water-carrying system, they form scale. The scale prevents effective heat transfer, interferes with fluid flow, facilitates corrosive process and harbors bacteria. This scale is an expensive problem in many industrial water systems causing delays and shutdowns for cleaning and removal.

Scale-forming compounds can be prevented from precipitating by inactivating their cations with chelating or sequestering agents so that the solubility of their reaction products is not exceeded. Generally, this requires many times as much chelating or sequestering agent as cations and these amounts are not always desirable or economical.

It is well known in the art that certain inorganic polyphosphates will prevent such precipitation when added in amounts for less than the concentrations needed for sequestering or chelating. When a precipitation inhibitor is present in a potentially scale-forming system, at a markedly lower concentration than that required for sequestering the scale-forming cations, it is said to be present in threshold amounts. Generally, threshold inhibition takes place at a weight ratio of threshold active compound to scale-forming cation components of less than about 0.5 to 1.0. When the scale-forming compound is alkaline earth metal, carbonate, sulfate, oxalate, phosphate, fluoride or silicate, the novel compounds of the present invention will inhibit their precipitation from solution when added to the solution in threshold amounts of up to about 100 parts by weight per million parts of water, preferably up to about 25 parts per million for most commercial purposes.

The "threshold" concentration range can be demonstrated in the following manner. When a typical scale-forming solution containing the cation of a relatively insoluble compound is added to a solution containing the anion of the relatively insoluble compound and a very small amount of a threshold active inhibitor, the relatively insoluble compound will not precipitate even when its normal equilibrium concentration has been exceeded. If more of the threshold active compound is added, a concentration is reached where turbidity or a precipitate of uncertain composition results. As still more of the threshold active compound is added, the solution again becomes clear. This is due to the fact that threshold active compounds in high concentrations also act as sequestering agents. Thus, there is an intermediate zone between the high concentrations at which threshold active compounds sequester the cations of relatively insoluble compounds and the low concentrations at which they act as threshold inhibitors. Therefore, one could also define "threshold" concentrations as all concentrations of threshold active compounds below that concentration at which this turbid zone or precipitate is formed.

The polyphosphates are generally effective threshold inhibitors for many scale-forming compounds at temperatures below 100° F. but after prolonged periods at higher temperatures, they lose some of their effectiveness. Moreover, in an acid solution, they revert to ineffective or less effective compounds.

The novel compounds of the present invention which are especially suitable as threshold agents include compounds of the formulas $$P(O)_a(R^1)_b[CH_2P(O)(OR^2)_2]_{31b}$$

$$P(O)[CH_2PO(OR_1)_2]_3$$

$$P[CH_2PO(OR)_2]_3$$

For example, tris(methyl phosphonic acid) phosphine, tris(methyl phosphonic acid) phosphine oxide, the monosodium salt of tris(methyl phosphonic acid) phosphine, disodium salt of tris(monophosphonic acid) phosphine oxide, the hexapotassium salt of tris(monophosphonic acid) phosphine, hexalithium salt of tris(monophosphonic acid) phosphine. Not only are these compounds effective inhibitors at room temperatures but they are also effective at elevated temperatures. Moreover, they retain their effectiveness in acid and salt solution.

SEQUESTERING AGENTS

It is well understood that generally the ability of a sequestering agent to sequester or inhibit the precipitation of metal ions effectively is dependent upon the particular metal ion and the pH additions. For example, a sequestering agent which is usually considered quite effective in sequestering a particular metal ion in an alkaline solution is usually found to be markedly less effective toward the same or another metal ion in an acid solution. In addition, it has usually been found that many sequestering agents are really only truly effective toward a particular metal ion within a narrow pH range. An outstanding example of this is the ability of the sequestering agent (sodium gluconate) to effectively sequester the ferric ion only at a pH of about 12 or above. As can be appreciated, therefore, sequestering agents which are effective toward many and various metal ions over a wide range of pH values would be an advancement in this art.

The novel compounds of the present invention are effective sequestering agents for metal ions in an aqueous solution and include, for example, compounds of the following general formulas:

$$P(O)_a(R^1)_b[CH_2P(O)(OR^2)_2]_{31}$$

$$P[CH_2PO(OR)_2]_3$$

Suitable specific compounds are illustrated by those named above under threshold agents. The sequestering agents of the present invention exhibit, in addition to their sequestering ability, such advantageous properties as being hydrolytically stable, that is having a substantial resistance to hydrolysis or degradation under varying pH and temperatures and relatively inert or noncorrosive to metals such as zinc, copper, aluminum and the like.

The amount of the sequestering agent necessary to be effective varies with, inter alia, the type and amount of problem metal ions, pH conditions, temperature and the like but in any event, only minor amounts are usually sufficient. The amount used in the present invention varies from about 100 p.p.m. to about 5,000 p.p.m. at a pH from about 8 to 12.

In order to illustrate the sequestering ability of the novel compounds of the present invention, the following tests and comparisons were made with the indicated results.

One gram of the novel compound of the present invention is dissolved in an aqueous solution containing 2,000 parts per million of $NA_2CO_3$ and titrated to a cloudy endpoint with 0.25 M calcium acetate at a pH of 11 and a temperature of 25° C. Data is given in the table I below:

TABLE I

| Additive | Milligrams of Calcium Sequestered by 1 Gram of Additives |
|---|---|
| $H_3O_3P(CH_2PO_3H_2)_2$ | 525 |
| $P(CH_2PO_3H_2)_3$ | 400 |
| $OP(CH_2PO_3H_2)_3$ | 700 |
| Sodium tripolyphosphate (S.T.P.) | 250 |

As can be seen from table I, the novel compounds of the present invention have a superior sequestering ability than that of the S.T.P.

DETERGENT BUILDERS

The sequestering agents of the present invention may be advantageously employed as builders and when thus employed can be used with any of the conventional detergents classed as synthetic nonsoap anionic, nonionic and amphoteric surface active compounds and mixtures thereof. Anionic surface active compounds such as a fatty alcohol, fatty acid, sterol, a fatty glyceride, a fatty amine, an aryl amine, a fatty mercaptan, tall oil, etc. Nonionic surface active agents also include those products produced by condensing one or more relatively lower alkyl alcohol amines such as methanolamine, ethanolamine, propanolamine, etc. with a fatty acid such as lauric acid, cetyl acid, tall oil fatty acid, etc. to produce the corresponding acid. Other advantageous nonionic surface active agents are condensation products of a hydrophilic compound having at least one active hydrogen atom and a lower alkylene oxide. For example, the condensation product of an aliphatic alcohol containing from about eight to about 18 carbon atoms and from about 3 to about 30 moles of ethylene oxide per mole of the alcohol or the condensation products of an alkyl phenol containing from about eight to about 18 carbon atoms in the alkyl group and from about 3 to about 30 moles of ethylene oxide per mole alkyl phenol.

Amphoteric surface active compounds can be described as compounds which have both anionic and cationic groups in the same molecule. Such compounds may be grouped into classes corresponding to the nature of the anionic forming group which is usually carboxy sulfo or sulfato. Examples of such compounds include sodium-N-coco-compounds which can be broadly described as compounds containing hydrophilic or lyophilic groups in their molecular structure and ionized in an aqueous medium to give anions containing the lyophilic group. These compounds include the sulfated or sulfonated alkyl or aryl or alkyl aryl hydrocarbons and alkaline metal salts thereof. For example, sodium salts of long chain alkyl sulfates, sodium salts of alkyl naphthalene sulfonic acid, sodium salts of sulfonates abietenes, sodium salts of alkylbenzene sulfonic acids, particularly those in which the alkyl group contains from eight to 24 carbon atoms, sodium salts of sulfonated mineral oils and sodium salts of sulfosuccinic acid esters such as sodium dioctyl sulfosuccinate.

Nonionic surface active compounds can be broadly described as compounds which do not ionize but usually acquire hydrophilic characteristics from an oxygenated side chain, such as polyoxyethylene while the lyophilic part of the molecule may come from fatty acids, phenols, alcohols, amides or amines. Examples of nonionic surface active agents include products formed by condensing one or more alkylene oxides of two to four carbon atoms such as ethylene oxide or propylene oxide, preferably ethylene oxide alone or with other alkylene oxides with a relatively hydrophobic beta amino propionate, sodium-N-lauryl beta iminodipropionate and the like. Other typical examples of these categories of the anionic, nonionic and/or amphoteric surface active agents are described in Schwartz and Perry, *Surface Active Agents*, Interscience Publishers, New York (1949).

The amount of builder necessary to be used with the surface active compound described hereinbefore may vary depending upon the end use type of active agent employed, pH conditions and the like. In general, the builders of the present invention can be employed in detergent compositions in any desired proportions which are effective, that is, which enhance the detergency characteristics of the surface active compound. Generally, these amounts vary from about 10 percent by weight to about 90 percent by weight of a detergent composition.

In order to illustrate the invention, a tris(methyl phosphonic acid) phosphine oxide builder was compared under carefully controlled conditions with sodium tripolyphosphate for building properties in hot water. The conditions of the test were: total detergent concentration—0.16 percent; temperature—60° C.; pH—9.5. The tests were made in a Launder-Ometer machine on standard soiled fabric specimens.

The following detergent compositions were used in the test with the percentages being by weight in the aqueous washing solution:

| | |
|---|---|
| Sodium dodecylbenzene sulfonate | 0.04% |
| Builder* | 0.10% |
| Sodium silicate | 0.02% |
| Sodium Carboxymethylcellulose | 0.00065% |

*Tris(methyl phosphonic acid) phosphine oxide [HO$_2$P(CH$_2$PO$_3$H$_2$)$_2$].

TABLE II

| Builder | % Soil Removal |
|---|---|
| 1. Tris(methyl phosphonic acid) phosphine oxide | 46 |
| 2. Sodium tripolyphosphate | 42 |
| 3. No builder present | 17 |

The above results indicate that a builder of the present invention compares very favorably with sodium tripolyphosphate, a widely used builder. Therefore, it can be appreciated that the new detergent builders of this invention exhibit building properties comparable or better to conventional widely used builders and can be used advantageously in many applications where the conventional builders are not suitable.

The novel compounds of the present invention can be used as detergent active agents in a built detergent composition. Water-soluble inorganic builders, water-soluble organic builders or mixtures thereof can be used to enhance the detergency of the present novel compounds. These builders include, for example, the conventional alkali metal polyphosphates, i.e., the tripolyphosphate and pyrophosphate (sodium tripolyphosphate, tetrasodium polyphosphate, tetrapotassium phosphate, disodium pyrophosphate and the like); the amino polycarboxylic acids and salts such as the sodium, potassium and ammonium salts of nitrilotriacetic acid, the sodium, potassium and ammonium salts of amino tri(methylene phosphonic acid) as well as the free acid and the diphosphonic acids and salts. Generally speaking, the amount of the novel compounds used as an active ranges from about 10 percent by weight to about 90 percent by weight of a detergent composition.

The detergent compositions of the present invention can be prepared in any of several commercially desirable composition forms such as bar, granular, plate, liquid and tablet form.

STABILIZATION OF PEROXY SOLUTIONS

The use of a stabilizing agent to minimize the decomposition of the peroxy compound is well established in the peroxy bleaching art because, among other things, the oxygen released by the decomposition of the peroxy compound in general has no bleaching action as contrasted with the normal autodecomposition of the peroxy compound which does function as a bleaching agent. In fact, the decomposition of the peroxy compound may be harmful. For example, cellulosic materials in strongly alkaline peroxy solutions are attacked by the oxygen from decomposition with the result of loss of strength by the materials. In general, stabilizing agents are of various and diverse nature and the ability of a material to be an effective stabilizing agent is apparently unpredictable. For example, although a few sequestering agents such as sodium pyrophosphate can be considered as stabilizing agents, the majority of sequestering agents are not considered to be effective stabilizing agents while such nonsequestering materials as sodium stannate and sodium silicate have been reported as being effective stabilizing agents. Therefore, due to their unpredictability and their diverse nature, the stabilizing agents for peroxy solutions vary in their ability with changes in the prevailing conditions such as pH, temperature conditions and the like of the peroxy solutions. For today's bleaching conditions, the stabilizing agent should preferably be effective in alkaline solutions and under relatively high temperature conditions which are frequently encountered in practice as well as being compatible with other additives usually present in the peroxy bleaching solutions such as optical whiteners, that is, brighteners or fluorescent white dyes, wetting agents and the like. It has been found that the novel compounds of the present invention having the following general formula $$P(O)_a(R^1)_b[CH_2P(O)(OR^2)_2]_{3\text{-}b}$$

$$P(O)[CH_2PO(OR_1)_2]_3$$

$$P[CH_2PO(OR)_2]_3$$

are effective establishing agents for peroxy solutions as will more fully be discussed hereinafter. Compounds illustrative of the invention are named above under threshold agent.

The stabilizing agents of the instant invention exhibit, in addition to their stabilizing ability, the highly beneficial properties of being highly water soluble and hydrolytically stable, that is having a substantial resistance to hydrolysis or degradation under various pH and temperature conditions.

Peroxy solutions which are capable of being stabilized in addition to hydrogen peroxide and its addition compounds, such as the peroxide of sodium and the super oxide of potassium, include urea percompounds, perborates, persulfates and the peracids such as persulfuric acid, peracetic acid, peroxy monophosphoric acid and their water-soluble salt compounds such as sodium, potassium, ammonium and organic amine salts.

Depending upon, inter alia, the particular peroxy-compound used, the pH of the aqueous peroxy solution is usually adjusted with inorganic alkali metal basic materials, such as sodium hydroxide, sodium carbonate, sodium silicate, di and trisodium phosphates and the like, including mixtures of these as well as the potassium forms of the foregoing materials, to a pH of between about 7.5 and about 12.5. Usually if the pH is higher than about 12.5 rapid bleaching occurs and the peroxycompounds rapidly decompose so that it is difficult to control a proper bleaching rate without undue damage to the fibers. At pH values lower than about 7.5, the rate of bleaching in most cases is slow to the extent of being uneconomical for bleaching.

The concentration in peroxy solutions can vary depending upon, inter alia, the type of peroxy-compound, pH, temperature, type of bleaching desired and the like, however, normal concentrations, i.e. from about 0.01 to about 5 percent can be used with concentrations from about 0.2 to about 3 percent being preferred.

The stabilizing agents of the present invention may be dissolved in the peroxy solution which is ready for use or may be incorporated in a concentrated peroxy solution, such as a 35 percent solution of hydrogen peroxide, which is usually further diluted to form the peroxy solution for bleaching. In addition, the stabilizing agent can be incorporated in dry bleach compositions, such as perborate compositions, by admixing therewith and the resulting composition dissolved in the aqueous system immediately preceding its end use application. In any event, the stabilizing agent is intended to be used with the peroxy solution at the time of its use for bleaching purposes.

The concentration of the stabilizing agent of the present invention in the peroxy solution can vary depending upon, inter alia, concentration of the peroxy solution, type of peroxycompound used, pH, temperature and the like and usually for normal concentrations of peroxy solutions and with conventional bleaching methods, the stabilizing agent is preferably present in concentrations from about 0.001 to about 5 percent with from about 0.1 percent to about 1 percent being especially preferred.

STABILIZATION OF CHLORINE RELEASING AGENTS

The novel compounds of the present invention can be used to stabilize chlorine releasing agents in solution to prevent their decomposition. The chlorine releasing agents which are suitable for use are those water-soluble organic and inorganic compounds which are believed to have oxidizing power by virtue of containing "available-chlorine" which can react in aqueous solution to form hypochlorous acid or the hypochlorite ion. Such organic compounds include the alkyl hypochlorites and especially the lower alkyl hypochlorites, such as ethyl hypochlorite, propyl hypochlorite, n-butyl hypochlorite and tert-butyl hypochlorite; the N-chlorinated heterocyclic compounds and especially the five and six membered N-chlorinated heterocyclic compounds, such as, hydantoin, N-chlorosuccinimide and the triazines, such as the cyanuric acids and salts which include trichloroisocyanuric acid, dichloroisocyanuric acid, sodium dichloroisocyanurate and potassium dichloroisocyanurate, polychlorocyanurate complexes as disclosed and described in U.S. Pat. Nos. 3,035,054; 3,035,056; 3,035,057; 3,150,132 and 3,072,654 such as [(monotrichloro)tetra-(monopotassium dichloro) pentaisocyanurate] as well as melamine, ammeline and ammelide; and the N-chloro aromatic and substituted aromatic sulfonamides, such as sodium benzene sulfochloroamide, sodium nitrobenzenesulfochloroamide and sodium p-toluenesulfonchloroamide. Such inorganic compounds include the alkali metal chlorine-containing compounds, such as sodium hypochlorite, sodium chlorite and lithium hypochlorite, the alkaline earth metal chlorine-containing compounds, such as calcium hypochlorite and barium hypochlorite and the "chlorinated trisodium phosphates," a class of compounds which consist of physicochemical combination in unitary crystalline form of trisodium phosphate and sodium hypochlorite. The "chlorinated trisodium phosphates" are known and are described along with their methods of preparation in U.S. Pat. Nos. 1,555,474 or 1,965,304.

The amount of stabilizer, i.e. novel compounds of the present invention, used to stabilize the chlorine releasing agents in solution can vary from about 100 p.p.m. to about 5,000 p.p.m.

EXAMPLE 1

A mixture of 19.1 g. (0.1 mol) of $C_2H_5O(O)P(CH_2Cl)_2$ (b.p. 104°–110° C./1 mm. $n_D^{20}$=1.4812) and 66.4 g. (0.4 mol) of $P(OC_2H_5)_3$ is heated with stirring in a nitrogen atmosphere at 160° C. After about 6 hours there are evolved from the reaction mixture 11.5 g. (90 percent) of ethylchloride. On fractional distillation there are recovered 29.1 g. of triethylphosphite (gas chromatographic identification). After 6.9 g. of intermediate fraction, b.p. 55°–146° C./0.001 mm., there are obtained further 27.8 g. (70 percent) of $C_2H_5O(O)P[CH_2P(O)(OC_{25})_2]_2$, b.p. 146°–153° C./0.001 mm., $n_D^{20}$=1.4610.

| Analysis | $C_{12}H_{29}O_8P_3$ | | (394.28) |
|---|---|---|---|
| Calc'd % | C 36.55 | H 7.41 | P 23.57 |
| Found % | C 35.40 | H 7.44 | P 22.23 |

EXAMPLE 2

A mixture of 24.5 g. (0.137 mol) of $P(CH_2Cl)_3$ and 150 g. (0.9 mol) of $P(OC_2H_5)_3$ is refluxed in a nitrogen atmosphere (160°–66° C.). After about 12 hours the evolution of ethyl chloride is finished. (22.7 g. 86 percent of ethyl chloride). There are formed two layers. The lower layer solidifies on cooling. According to infrared analysis and mixed melting point with an authentic sample, it is $OP[CH_2P(O)(OC_2H_5)_2]_3$. From the upper layer crystallizes a small amount of $OP(CH_2Cl)_3$. This is filtered off; m.p. 92°–95° C. The distillation of the filtrate yields 80 g. (0.483 mol) of $P(oc_2H_5)_3$. The residue solidifies on cooling, yielding a waxylike mass. Yield 40.5 g. of $P[CH_2P(O)(OC_2H_5)_2]_3$; m.p. 78°–88° C. The compound is hygroscopic.

On oxidation in known manner, e.g., on leading in air or oxygen, on treating with hydrogen peroxide, etc. the corresponding tris-(0,0'-diethyl-phosphonylmethyl)-phosphine oxide is obtained.

| Analysis | $C_{15}H_{36}O_9P_4$ | | (484.36) |
|---|---|---|---|
| Calc'd % | C 37.20 | H 7.50 | P 25.58 |
| Found % | C 35.45 | H 7.26 | P 25.48 |

For the conversion to the free acid $P[CH_2P(O)(OH)_2]_3$, 5 g. of tris-(0,0'-diethyl-phosphonylmethyl)-phosphine are heated with 20 ml. of HCl 1:1 in a bomb tube at 200° C. for 5 hours or are refluxed with concentrated HCl. Upon evaporation there are obtained 3.7 g. (97 percent) of the free acid as oily product. The acid can be titrated as hexabasic acid and shows breaks at pH 4.4 and 9.8 for 3 equivalents each. Equivalent weight calculated 61.6, found 60.

EXAMPLE 3

A mixture of 25 g. (0.128 mol) of OP(CH$_2$Cl)$_3$ and 130 g. (0.78 mol) of P(OC$_2$H$_5$)$_3$ is refluxed (160°–165° C.) until the evolution of ethyl chloride has finished. In about 6 hours, 21.8 g. (99 percent) of ethyl chloride are recovered. The residue solidifies completely upon cooling. It is now dissolved in 100 ml. of ethyl alcohol and 300 ml. of ether are added. The mixture solidifies completely. No solvent can be poured off. On pressure filtering, there are obtained 34.8 g. of tris-(0,0'-diethyl-phosphonylmethyl)-phosphine oxide. Ether is added to the mother-liquor which is cooled to low temperatures and an additional 5.5 g. of endproduct separate. Now the mother-liquor is completely concentrated by evaporation and ether is added. An additional 8.1 g. of endproduct separate. Yield 48.4 g. (75.5 percent) of tris-(0,0'-diethyl-phosphonylmethyl)-phosphine oxide; m.p. 168°–170° C. The product shows high absorption power. 8.1 g. absorb, for example, 41.4 g. of triethyl phosphite which cannot be removed even under vacuum. 48 g. dissolved in 100 ml. of ethanol and 300 ml. of ether added thereto yield a gel. A 2 percent solution of benzene also is totally gelatinized. No solvent can be decanted. The novel product absorbs preferentially benzene in a sytrene-benzene mixture (1:1).

The tri-chloromethyl-phosphine oxide serving as starting compound can be prepared in the following way: To 17.9 g. (0.1 mol) of tri-chloromethyl-phosphine in 100 ml. of benzene there are added dropwise 16.0 g. (0.2 mol) of bromine. A yellow precipitate is formed consisting of tri-chloromethyl-dibromophosphoran, which is decomposed by 1.8 g. of water. The precipitate dissolves and there are formed two layers. For the neutralization there are added dropwise 8 g. of NaOH dissolved in 12 ml. of water and the brown-red solution becomes colorless. The benzene layer is separated and the water phase is extracted once more with benzene. From the benzene solution, after evaporation, there are obtained 11.5 g. (59.0 percent) of tri-chloromethyl-phosphine oxide; m.p. 100°–101.5° C.

EXAMPLE 4

To a solution of 9.8 g. (0.05 mol) of OP(CH$_2$Cl)$_3$ in 100 ml. of decalin which is heated at 160° C. there are added dropwise, within 3 hours, 25 g. (0.2 mol) of P(OCH$_3$)$_3$. The evolving methyl chloride is continuously removed from the mixture. The decalin and excess trimethyl phosphite are distilled off under reduced pressure. The solid residue is recrystallized from methanol-ether mixture. Yield 15 g. (75 percent) of tris-(0,0'-dimethylphosphonylmethyl)-phosphine oxide; m.p. 169°–171° C.

For the conversion to the corresponding acid OP[CH$_2$P(O)(OH)$_2$]$_3$. 150 g. of tris-(0,0'-dimethyl-phosphonylmethyl)-phosphine oxide are refluxed together with 200 ml. of concentrated HCl and 300 ml. of water for 10 hours, then evaporated to dryness and dried in the high vacuum. There are obtained 93.6 g. (94.2 percent) of tris-(dihydroxy-phosphonylmethyl)-phosphine oxide as highly viscous oil. The compound shows in the P$^{31}$ NMR spectrum two peaks, namely at 40.7 p.p.m. (phosphine oxide) and 16.9 p.p.m. (phosphonyl) in the proportion of 1:3, and in the H$^1$NMR spectrum two peaks, namely at 5.958 δ (hydroxyl) and 3.466 δ (two doublets having the coupling constants phosphine oxide CH$_2$ 15.6 c.p.s. and phosphonyl CH$_2$ 20.3 c.p.s. by which the structure is ascertained.

| Analysis | C$_3$H$_{12}$O$_{10}$P$_4$ | | |
|---|---|---|---|
| Calc'd % | C 10.85 | H 3.64 | P 37.32 |
| Found % | C 11.61 | H 3.97 | P 34.56 |
| | C 10.18 | H 3.60 | P 39.28 |

The acid is very soluble in alcohol and water. It forms crystalline salts of the type OP[CH$_2$PO$_3$(cyclo-C$_6$H$_{11}$NH$_3$)$_2$]$_3$, m.p. 190° C. and OP(CH$_2$PO$_3$HNa)$_3$·xH$_2$O, m.p. 180° C. The last cited salt loses its water at the melting point and then does not melt up to 260° C. Further salts which have been prepared are:

OP(CH$_2$PO$_3$Na$_2$)$_3$
OP(CH$_2$PO$_3$HBa/2)$_3$
OP(CH$_2$PO$_3$Fe)$_3$ (grey powder)

OP(CH$_2$PO$_3$Ba)$_3$(m.p. 400° C.)
OP(CH$_2$PO$_3$Ag$_2$)$_3$
OP(CH$_2$PO$_3$)$_3$Fe$_2$ (slightly yellowish powder)

The acid can be titrated as a hexabasic acid:
1st break at pH 4.4(3 equivalents, calc'd 110.7—found 111.5);
2nd break at pH 10.7 (3 equivalents, calc'd 110.7—found 107.5);

EXAMPLE 5

A mixture of 5.9 g. (0.031 mol) of OP(CH$_2$Cl)$_3$ and 45 g. (0.17 mol) of P(OC$_4$H$_9$-n)$_3$ is heated with stirring at 170° C. and the formed butyl chloride is continuously distilled off. After 5 hours there are formed 7.7 g. (91.5 percent) of butyl chloride. Now the excess tributyl phosphite is distilled off in the vacuum and the residue is dried in the high vacuum. There are obtained 18.9 g. (93.5 percent) of crude product yielding 12.5 g. of pure tris-(0,0'-di-n-butyl-phosphonylmethyl)-phosphine oxide after recrystallization from ether; m.p. 109°–111° C. There can be recovered further 4.8 g. of pure compound from the mother-liquor so that the total yield amounts to 17.3 g. (85.5 percent). The compound shows in the H$^1$NMR spectrum three peaks, namely at 0.71 to 2δ, 2.93δ and 4.09δ, which ascertain the structure of the compound. Tris-(0,0'-di-n-butyl-phosphonylmethyl)-phosphine oxide is soluble in organic solvents and insoluble in water. It is therefore also suited as extracting agent for metal salts from aqueous solution.

| Analysis | C$_{27}$H$_{60}$O$_{10}$P$_4$ | | |
|---|---|---|---|
| Calc'd % | C 49.50 | H 9.04 | P 18.52 mol. weight 668.7 |
| Found % | C 49.02 | H 9.35 | P 18.71 mol. weight 623 (osometrically, in benzene) |

EXAMPLE 6

A mixture of 9.75 g. (0.05 mol) of tri-chloromethyl-phosphine oxide and 62.5 g. (0.3 mol) of tri-isopropylphosphite is heated at 180°–183° C. for 4 hours. Within this time there are cleaved 12.7 g. (100 percent) of isopropylchloride. After having distilled off the excess tri-isopropyl phosphite at 70°–80° C./10 mm. (28.2 g.), the residue (27.9 g.) solidifies upon cooling. It is recrystallized from light petroleum. Yield 24.0 g. (85 percent) of tris-(0,0'-di-isopropyl-phosphonylmethyl)-phosphine oxide; m.p. 85°–87° C. The compound is soluble in water and in many organic solvents.

| Analysis | C$_{21}$H$_{48}$O$_{10}$P$_4$ | | |
|---|---|---|---|
| Calc'd % | C 43.15 | H 8.28 | P 21.20 mol. weight 584.5 |
| Found % | C 43.27 | H 8.34 | P 21.50 mol. weight 561 (osometrically, in benzene) |

The compound shows in the H$^1$ NMR spectrum three peaks, namely at 2.91δ (two doublets with the coupling constants phosphine oxide—CH$_2$ 15.8 c.p.s. and phosphonyl—CH$_2$ 20.4 c.p.s.), 4.78δ (multiplet having the coupling constants POCH 7.9 c.p.s. and H—H 6.1 c.p.s.) and 1.32δ(coupling constant H—H 6.1 c.p.s.) which ascertains the structure.

The conversion to the corresponding acid can be achieved by thermal decomposition. 20 g. of the compound are heated at 190° C. There are split off 8.6 g. (100 percent) of propene. The acid can be titrated as hexabasic acid and gives the same P$^{31}$ and H$^1$ NMR spectrum as the acid obtained by hydrolysis with hydrochloric acid.

EXAMPLE 7

A mixture of 5.0 g. (0.026 mol) of OP(CH$_2$Cl)$_3$ and 64 g. (0.15 mol) of

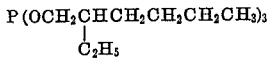

is heated under reduced pressure (about 100 mg. Hg) at 170°–180° C. for 4 hours. Thereby 10 g. (88 percent) of 2-ethylhexylchloride distill off. Now the excess phosphite is distilled off in the high vacuum at 115°–130°/0.005 mm. As residue there remain 21.5 g. (82 percent) of tris-(0,0'-di-2-ethylhexyl-phosphonylmethyl)-phosphine oxide as viscous oil. The compound is soluble in organic solvents and insoluble in water.

| Analysis | C$_{51}$H$_{108}$O$_{10}$P$_4$ | | (mol. weight 1005.3) |
|---|---|---|---|
| Calc'd % | C 60.93 | H 10.83 | P 12.32 |
| Found % | C 61.40 | H 10.50 | P 12.10 |

EXAMPLE 8

A mixture of 4.4 g. (0.02 mol) of di-chloromethyl-phosphinic acid n-butylester and 20 g. (0.08 mol) of tri-n-butylphosphite is heated with stirring at 180° and the formed n-butyl chloride is continuously distilled off. After 11½ hours the theoretical amount of n-butyl chloride (3.6 g.) is split off. After the easily volatile products are distilled off from the reaction mixture, namely 7 g. at 78°–125° C./10 mm. and 4 g. at 85°–105° C./0.05–0.09 mm., there remain as liquid residue 10.6 g. (98.8 percent) of bis-(0,0'-di-n-butyl-phosphonylmethyl)-phosphinic acid n-butylester, which is pure according to the H$^1$NMR spectrum. The compound could not be distilled without decomposition. n$_D^{20}$ 1.4558.

| Analysis | C$_{22}$H$_{49}$O$_8$P$_3$ | | (534.55) |
|---|---|---|---|
| Calc'd % | C 49.43 | H 9.24 | P 17.38 |
| Found % | C 49.21 | H 9.03 | p 17.44 |

EXAMPLE 9

A mixture of 4.4 g. (0.02 mol) of di-chloromethyl-phosphinic acid n-butylester and 13.3 g. (0.07 mol) of triethylphosphite is heated with stirring to 170° C. After 11 hours there are cleaved 2.6 g. (100 percent) of ethylchloride. After the easily volatile products are distilled off from the reaction mixture, namely 4.1 g. at 50°–110°/10 mm., there remain as liquid residue 7.8 g. (93 percent) of bis-(0,0'diethyl-phosphonylmethyl)-phosphinic acid n-butylester; n$_D^{20}$ 1.4580. The H1NMR spectrum ascertains the structure. The compound could not be distilled without decomposition.

| Analysis | C$_{14}$H$_{33}$O$_8$P$_3$ | | (422.32) |
|---|---|---|---|
| Calc'd % | C 39.81 | H 7.88 | P 22.0 |
| Found % | C 39.27 | H 7.78 | P 22.47 |

EXAMPLE 10

A mixture of 4.4 g. (0.02 mol) of di-chloromethyl-phosphinic acid n-butylester and 16.6 g. of tri-isopropylphosphite is heated with stirring at 150° C. for 6 hours. The temperature has to be carefully controlled since the compound easily decomposes. After the easily volatile products are distilled off from the reaction mixture, namely 10 g. at 60°–73° C./10 mm. and 1.4 g. at 43.54° C./0.02 mm., there remain as liquid residue 7.2 g. (75.5 percent) of bis-(0,0'-di-isopropylphosphonylmethyl)-phosphinic acid n-butylester; n$_D^{20}$ 1.4551. The spectrum shows, besides the compound mentioned above, also the presence of 0,0'-di-isopropylphosphonylmethyl-chloromethyl-phosphinic acid n-butylester.

EXAMPLE 11

For preparation of the free acid, 15 g. of bis-(0,0'-diethylphosphonylmethyl)-phosphinic acid ethylester are heated with concentrated hydrochloric acid for 40 hours. After concentration by evaporation there remain 10 g. (91 percent) of HO(O)P[CH$_2$,o.,oh.$_2$]$_2$· 2H$_2$O as viscous liquid. The cyclohexylamine salt melts at 205.2° C. According to the thermographic analyses and H$^1$NMR spectrum it is a dihydrate. The acid can be titrated as a tetrabasic acid and shows breaks at pH 5.2 (3 equivalents calculated for dihydrate 96.6, found 99.2) and at pH 8.8 (1 equivalent calc'd 290, found 283). According to the total consumption of acid, the equivalent weight is 73.4 (theory 72.5). The fifth acid group could be titrated in aqueous solution after adding NaCl.

EXAMPLE 12

A mixture of 2.4 g. (0.012 mol) of tris-chloromethylphosphine oxide and 9.5 g. (0.037 mol) of diphenylphosphinous acid n-butylester is heated under nitrogen at 170° C. After 30 minutes there are evolved 2.5 g. of butylchloride and after further heating for an hour totally 3.3 g. (97 percent of butylchloride. Upon cooling, the reaction mixture solidifies completely. Crude yield 8.6 g. Incompletely reacted starting material is removed with boiling water. Yield 8.3 g. (97.5 percent) of tris-(diphenyloxophosphinomethyl)-phosphine oxide of the formula [(C$_6$H$_5$)$_{2a}$P(O)CH$_2$]$_{3\beta}$PO, m.p. 230° C. (from acetone). The compound shows in the H$^1$NMR spectrum peaks for PCH$_2$P at 3.52δ (quartet J$_{P\alpha H}$ 12.5 c.p.s. J$_{P\beta H}$ 15.0 c.p.s. 6H) and C$_6$H$_5$ at 7.56δ (multiplet, 30H). The spectrum is therefore in agreement with the proposed structure.

EXAMPLE 13

A mixture of 5.7 g. (0.3 mol) of bis-chloromethylphosphinic acid ethylester and 15.8 g. (0.6 mol) of diphenylphosphinous acid n-butylester is heated under nitrogen at 170° C. After 4 hours, there are evolved 4.8 g. (87 percent) of butylchloride. The volatile products are distilled off at 123°–128° C. /0.1 mm. Upon cooling, the reaction mixture solidifies. Yield 13 g. (83 percent) of bis-(diphenyl-oxophosphinomethyl)-phosphinic acid ethylester of the formula

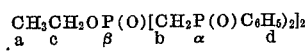

m.p. 105°–113° C.

The compound shows in the H$^1$NMR spectrum peaks for $a$ at 0.79δ(J$_{HH}$7 c.p.s., $b$ at 3.26δ(J$_{P\alpha H}$ 13 c.p.s., J$_{P\beta H}$ 18 c.p.s.), $c$ at 3.75δ and $d$ at 7.58.

For the preparation of the free acid, 5 g. of the compound and 20 ml. of concentrated HCl are refluxed for 15 hours. The hydrochloric acid is evaporated and the residue recrystallized from alcohol. The acid is a white solid substance, m.p. 246°–250° C.

Analysis
    Equivalent weight calc'd 494.4—found 495.

EXAMPLE 14

A mixture of 3.7 g. (0.023 mol) of bis-chloromethyl-methylphosphine oxide and 14.9 g. (0.09 mol = 100 percent excess) of phosphorous acid triethylester (triethylphosphite) is heated under nitrogen at 170° C. After 5 hours, there are released 2.9 g. (98 percent) of ethylchloride. Under cooling, the reaction mixture solidifies totally. The excess triethylphosphite is strongly absorbed by the formed phosphine oxide and cannot be removed completely in the vacuum. Upon several times recrystallization of the crude product in alcohol-ether, there are obtained 3.2 g. (38.3 percent) of bis-(0,0'-diethylphosphonylmethyl)-methylphosphine oxide of the formula

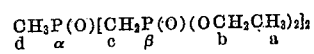

m.p. 102°–104° C.

Analysis     $C_{11}H_{27}O_7P_3$     (364.3)
Calc'd %     C 36.27     H 7.47
Found %     C 46.40     H 7.60

The compound shows in the H¹NMR spectrum peaks for $a$ at 1.35δ(triplet, $J_{HH}$ 7 c.p.s., 12H), $b$ two different kinds at 4.15δ and 4.18δ (each consisting of two overlapping quartets, $J_{HH}$ 7 c.p.s., $J_{POCH}$8.5 c.p.s. 8H), $c$ at 2.68δ and 2.76δ (two quartets, $J_{P\alpha H}$ 15.6 c.p.s., $J_{P\beta H}$ 20.5 c.p.s., 4.4H), $d$ 1.81δ (doublet $J_{P\alpha H}$13.7 c.p.s., 3.3H).

EXAMPLE 15

A mixture of 3 g. of bis-chloromethyl-ethylphosphine oxide and 5.7 g. of phosphorous acid triethylester is heated at 170° C. for 6 hours. The theoretical amount (2.2 g.) of ethylchloride is evolved. The excess phosphoric acid triethylester is partly distilled off in the vacuum (cf. example 14) and the residue is recrystallized from alcohol-ether. There are obtained white crystals of bis-(0,0'-diethylphosphonyl-methyl)-ethylphosphine oxide of the formula

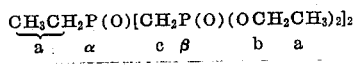

m.p. 45°–52° C.

The compound shows in the H¹NMR spectrum peaks for $a$ at 1.34δ ($J_{HH}$7 c.p.s., triplet, 12H), $b$ at 4.175δ($J_{HH}$7 c.p.s., $J_{POCH}$8.5 c.p.s., 8H), $c$ 2.708δ and 2.78δ (two quartets, $J_{P\alpha H}$16 c.p.s., $J_{P\beta H}$20.2 c.p.s.) and $d$ at 0.83δ to 2.33.

EXAMPLE 16

A mixture of 12.7 g. of bis-chloromethyl-dodecylphosphine oxide (m.p. 57°–58° C.) and 26.5 g. of phosphorous acid triethylester is heated at 170° C. for 6 hours. There are released 4.4 g. (84.5 percent) of ethyl chloride. Further heating does no longer yield more ethyl chloride. The excess triethylphosphite is distilled off and the residue (17.6 g. 85 percent) recrystallized from alcohol-ether. There are obtained white crystals of bis-(0,0'-diethylphosphonylmethyl)-dodecylphosphine oxide; m.p. 48°–54' C.

For the preparation of the acid, 6.8 g. of ester are refluxed in methyl alcohol and concentrated hydrochloric acid for 15 hours. Then, the mixture is concentrated by evaporation to dryness (the acid foams very strongly). There are obtained in quantitative yield bis-(dihydroxy-phosphonylmethyl)-dodecylphosphine oxide of the formula

The acid shows titration peaks at pH 4 (first and second equivalent equivalent weight found 207, calc'd 203.1), pH 6.9 (third equivalent found 132.5, calc'd 135.4) and pH 9.6 (fourth equivalent found 94.2, calc'd 101.6).

From the acid there can be prepared a di-, tri- and tetrasodium salt which are surface active. The disodium salt melts at 405°–410° C.; the tetrasodium salt does not melt until 460° C.

EXAMPLE 17

A mixture of 5.7 g. (0.03 mol) of bis-chloromethylphosphinic acid ethylester and 15.6 g. (0.06 mol) of phenylphosphonous acid di-n-butylester is heated under nitrogen at 170° C. for 7 hours. There are released 4.9 g. (89 percent) of butylchloride. The volatile products are distilled off (2.2 g., b.p. 105°–123° C./0.05 mm.). As a residue there are obtained 13.3 g. (86 percent) of bis-(O-n-butyl-phenylphosphinylmethyl)-phosphinic acid ethylester of the formula

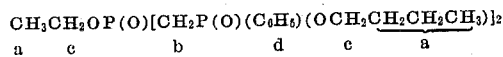

as a colourless oil; $n_D^{20}$ 1.5318.

Analysis     $C_{24}H_{37}O_6P_3$     (514.48)
Calc'd %     C 56.03     H 7.25     P 18.06
Found %     C 54.07     H 7.03     P 18.11

The compound shows in the H¹NMR spectrum peaks for $a$ at 0.66 bis 1.83δ, $b$ at 2.83δ (3.85H), $c$ at 3.91δ (6.5H) and $d$ at 7.50δ (10H).

For the conversion to the corresponding acid, 4 g. of the compound are refluxed in 20 ml. concentrated HCl for 15 hours and the hydrochloric acid is evaporated. There are obtained 2.2 g. of acid of the formula HOP(O)[CH₂P(O)C₆H₅)OH]₂ as viscous mass.

Analysis
Equivalent weight calc'd 124.8—found 119.5.

EXAMPLE 18

A mixture of 3.9 g. (0.02 mol) of tris-chloromethylphosphine oxide and 15.6 g. (0.06 mol) of phenylphosphonous acid di-n-butylester is heated under nitrogen at 170° C. for 2 hours. There are released 4.5 g. (82 percent) of butylchloride. The volatile products (2.3 g., b.p. 85°–93° C./0.05 mm.) are distilled off. The highly viscous residue is dissolved in acetone. An insoluble part is filtered off. After evaporation of the acetone there remains tris-(O-n-butyl-phenylphosphinylmethyl)-phosphine oxide of the formula

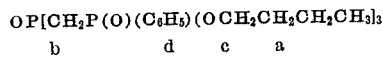

as a colorless oil.

Analysis     $C_{33}H_{48}O_7P_4$     (680.6)
Calc'd %     C 58.23     H 7.11     P 18.20
Found %     C 57.80     H 7.34     P 17.56

The compound shows in the H¹NMR spectrum peaks for $a$ at 0.66δ to 1.83δ (21H), $b$ at 3.10δ (6.2H), $c$ at 3.95δ (5.92H) and $d$ at 7.65δ (15H).

For the conversion to the corresponding acid, 5 g. of the compound are heated in 20 ml. of concentrated HCl with addition of ethyl alcohol for 15 hours. After concentration by evaporation to dryness the acid OP[CH₂P(O)(C₆H₅)OH]₃ is obtained as white solid residue which softens at 90° and gives a clear melt at 138° C.

Analysis
Equivalent weight calc'd 170.7, found 173.

EXAMPLE 19

A mixture of 2.5 g. of di-chloromethyl-dodecylphosphine oxide and 4.1 g. of phenylphosphonous acid di-n-butylester is heated at 170° C. for 6 hours. There can be recovered 5.4 g. (55 percent) of butylchloride. The volatile products are distilled off. The residue is reprecipitated in methyl alcohol. There are obtained 4.1 g. (49.5 percent) of bis-(O-n-butyl-phenylphosphinyl)-dodecylphosphine oxide as oil.

EXAMPLE 20

A mixture of 4.0 g. of di-chloromethyl-dodecylphosphine oxide and 6.7 g. of diphenylphosphinous acid n-butylester is heated at 170° C. for 3 hours. There can be recovered 1.2 g. (52percent) of butylchloride. The volatile products are distilled off. The remaining (7.7 g.) is recrystallized in light petroleum. There are obtained 6.8 g. (92.5 percent) of bis-(oxodiphenylphosphino)-dodecylphosphine oxide of the formula

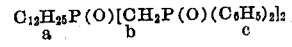

as a waxylike product.

The compound shows in the H¹NMR spectrum peaks for $a$ at 0.33 to 1.66δ (28H), $b$ at 2.96 and 3.2δ (two triplets $J_{PCH}$12.5 c.p.s., 3.9H) and $c$ at 7.28δ (multiplet, 20H).

The embodiments of the invention in which an exclusive property or privilege is claimed are defined as follows:

1. A method of inhibiting the precipitation of scale-forming salts in an aqueous system comprising adding to said system a phosphorus compound containing the atom skeleton P-(C-P)$_2$ or P-(C-P)$_3$ and corresponding to the formula:

$$P(O)_a(R^1)_b(CH_2P(O)(R^2)R^3)_{3\text{-}b}$$

wherein R¹, R² and R³ signify possibly substituted and/or ethylenically or acetylenically unsaturated hydrocarbon groups or heterocyclic groups attached through a carbon atom, RO groups where R is the group of a hydroxyl compound, HO group or MO group where M is an alkali metal atom, ammonium or substituted ammonium, $a$ is 0 or 1, and $b$ is 0 or 1, the amount of said compound added being a threshold amount in a weight ratio of said compound to the cation component of said scale-forming salts not in excess of 0.5 to 1 and which amount is less than that which would cause turbidity removable by a sequestering amount of said compound.

2. A method of claim 1 wherein at least one of R¹, R² and R³ is an RO, HO or MO group.

3. A method claim 1 wherein R¹ is hydroxyl, alkyl and alkenyl, R² and R³ are hydroxyl, alkoxy, alkenyloxy or MO, $a$ is 0 or 1 and $b$ is 0 or 1; the amount of said compound added being no more than a threshold amount up to about 100 parts per million and is a weight ratio of said compound to the cation component of said scale-forming salts not in excess of 0.5 to 1.

4. A method of claim 1 wherein $a$ is 1, $b$ is 0, R² and R³ are hydroxyl or MO; the amount of said compound added being no more than a threshold amount up to about 100 parts per million and in a weight ratio of said compound to the cation component of said scale-forming salts not in excess of 0.5 to 1.

5. A method of claim 1 wherein $a$ and $b$ are both 0, R² and R³ are hydroxyl or MO; the amount of said compound added being no more than a threshold amount up to about 100 parts per million and in a weight ratio of said compound to the cation component of said scale-forming salts not in excess of 0.5 to 1.

6. A method of inhibiting precipitation of metal cations from an aqueous solution containing said cations which comprises incorporating therein a sequestering quantity of a sequestering agent, phosphorus compound containing the atom skeleton P-(C-P)$_2$ or P-(C-P)$_3$ and corresponding to the formula:

$$P(O)_a(R^1)_b(CH_2P(O)(R^2)R^3)_{3\text{-}b}$$

wherein R¹, R² and R³ signify possibly substituted and/or ethylenically or acetylenically unsaturated hydrocarbon groups or heterocyclic groups attached through a carbon atom, RO groups where R is the group of a hydroxyl compound, HO groups or MO groups where M is a metal atom, ammonium or substituted ammonium, $a$ signifies 0 or 1, and $b$ is 0 or 1.

7. A method of claim 6 wherein at least one of R¹, R² and R³ is an RO, HO or MO group.

8. A method of claim 6 wherein R¹ is hydroxyl, alkyl and alkenyl, R² and R³ are hydroxyl, alkoxy, alkenyloxy or MO, $a$ is 0 or 1 and $b$ is 0 or 1.

9. A method of claim 6 wherein $a$ is 1, $b$ is O, R¹ is hydroxyl or MO.

10. A method of claim 6 wherein $a$ and $b$ are both 0, R² and R³ are hydroxyl or MO.

11. A method according to claim 6 wherein said metal cations are alkaline earth metal cations.

12. A method according to claim 6 wherein said metal cations are transitional metal cations selected from the group consisting of divalent and trivalent metal cations.

13. A method according to claim 12 wherein the metal cation is iron.

* * * * *